United States Patent [19]
Willis

[11] Patent Number: 5,964,187
[45] Date of Patent: Oct. 12, 1999

[54] ANIMAL BEDDING MATERIAL

[76] Inventor: Gregory Lynn Willis, 40 Davey St., Woodend, Victoria, Australia, 3442

[21] Appl. No.: 08/750,824

[22] PCT Filed: Jun. 16, 1995

[86] PCT No.: PCT/AU95/00349

§ 371 Date: Apr. 25, 1997

§ 102(e) Date: Apr. 25, 1997

[87] PCT Pub. No.: WO95/34197

PCT Pub. Date: Dec. 21, 1995

[30] Foreign Application Priority Data

Jun. 16, 1994 [AU] Australia ................. PM6275

[51] Int. Cl.⁶ ................................. A01K 1/015
[52] U.S. Cl. ............................................. 119/171
[58] Field of Search .................... 119/171, 172, 119/169, 573, 281.5

[56] References Cited

U.S. PATENT DOCUMENTS

| | | | |
|---|---|---|---|
| 2,092,155 | 9/1937 | Hackett . | |
| 3,941,090 | 3/1976 | Fry | 119/171 |
| 4,258,659 | 3/1981 | Rowell | 119/171 |
| 4,311,115 | 1/1982 | Litzinger | 119/172 |
| 4,458,629 | 7/1984 | Gerber | 119/172 |
| 4,599,192 | 7/1986 | Rose | 252/383 |
| 4,788,936 | 12/1988 | Billings | 119/171 |
| 4,794,022 | 12/1988 | Johnson et al. | 119/171 X |
| 4,961,930 | 10/1990 | Perdelwitz, Jr. et al. | 424/411 |
| 5,044,324 | 9/1991 | Morgan et al. | 119/171 |
| 5,060,598 | 10/1991 | Richards | 119/171 |
| 5,129,365 | 7/1992 | Hughes | 119/171 X |
| 5,135,743 | 8/1992 | Stanislowski et al. | 119/171 X |
| 5,143,023 | 9/1992 | Kuhns | 119/171 X |
| 5,152,251 | 10/1992 | Aukeman et al. | 119/171 |
| 5,193,488 | 3/1993 | Walton | 119/169 X |
| 5,209,186 | 5/1993 | Dewing | 119/172 |
| 5,265,561 | 11/1993 | Crawford | 119/172 |
| 5,271,355 | 12/1993 | Billings | 119/171 |
| 5,320,066 | 6/1994 | Gunter | 119/171 X |

FOREIGN PATENT DOCUMENTS

| | | |
|---|---|---|
| 1864092 | 3/1993 | Australia . |
| 0433221 | 6/1991 | European Pat. Off. . |
| 0579548 | 1/1994 | European Pat. Off. . |
| 2098448 | 11/1982 | United Kingdom . |
| 2261586 | 5/1993 | United Kingdom . |
| WO9307965 | 4/1993 | WIPO . |

OTHER PUBLICATIONS

Patent Abstracts of Japan, C 1162, p. 18, JP 5–284869 A (Mitajiri) Nov. 2, 1993.
Derwent Abstract Accession No. 85–193589/32, Class P14, JP 60–120926 A (Nisshin) Jun. 28, 1985.
Derwent Abstract Accession No. 91/086300, Class P14, JP 03–600619 A [Number indistinct] (Morita) Feb. 8, 1991.

Primary Examiner—Michael J. Carone
Assistant Examiner—Yvonne R. Abbott
Attorney, Agent, or Firm—Baker & Botts, L.L.P.

[57] ABSTRACT

The present invention relates generally to wood-derived products and more particularly to products derived from treated wood and their use such as in bedding material for animals in various industrial, domestic and research applications.

13 Claims, 4 Drawing Sheets

ANIMAL BEDDING MATERIAL

The present invention relates generally to wood-derived products and more particularly to products derived from treated wood and their use such as in bedding material for animals in various industrial, domestic and research applications.

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

Environmental concerns play a major role in the design of effective waste management protocols in a broad spectrum of industries. The wood industry, for example, generates vast quantities of waste annually throughout the world and it is essential for economic and environmental reasons that wood waste products be disposed of in an appropriate manner.

Preferred waste management practices facilitate the growth of secondary industries from the waste material. The growth of these secondary industries effectively subside the removal of the particular waste concerned. However, some waste products are considered too toxic or recalcitrant for further exploitation and consequently the cost of disposal of such material to the particular industry is passed ultimately to the consumer.

Wood is one of the most important renewable biomass resources in the world and is used in a variety of industries such as the building, textile and energy industries the building and construction industries, the use of softwood is frequently preferred. Soft wood trees (conifers or gymnosperms, i.e. plants with naked seeds) are cone bearing trees which do not contain vessel elements, whereas hard wood trees (angiosperms, i.e. plants with covered seeds) are generally porous in that they contain vessel elements. Structurally, wood varies greatly and for this reason, species are selected for specific purposes.

However, wood may be attacked by a variety of organisms such as fungi, bacteria, insects and marine borers. To combat biodeterioration of wood, chemical preservation is now a common practice. Without preservative treatment, insect damage or microbial degradation of wood may occur within three to five years.

One preservative treatment is known as chromated copper arsenate (hereinafter referred to as "CCA"). During CCA treatment of wood, the preservative ingredients become fixed in the wood cells as leach-resistant, insoluble precipitants of copper arsenate and chrome arsenate which do not vaporise or evaporate.

However, products from treated timber (such as CCA-treated timber) have been considered too toxic or an inappropriate choice for re-use or recycling. For example, wood shavings and sawdust have been used as animal bedding material in many industrial, domestic and research situations. In the State of Victoria, Commonwealth of Australia, alone, the recycling of wood products in the form of animal bedding has created approximately $AUD1.1 million industry. Such wood products would otherwise be of little value. As treated timber waste products have not been used in this or other recycling industries, a secondary industry has not developed for treated timber wastes which has resulted in the disposal of such treated timber waste being non-subsidised.

In accordance with the present invention, it has now been shown that treated wood products such as wood shavings and saw dust exhibit beneficial properties for caged and housed animals such as reducing respiratory infection and generally improving animal health, reducing animal waste odour and delaying biodeterioration of bedding material. The present invention provides, therefore, a valuable secondary industry for treated timber by-products.

Accordingly, one aspect of the present invention is directed to the use of a product derived from treated wood as an animal bedding material.

More particularly, the present invention contemplates the use of a product derived from treated wood as an animal bedding material, which material reduces the incidence of microbial infection in an animal maintained in the presence of said material.

Microbial infection as referred to herein encompasses infection by prokaryotic or eukaryotic organisms. For convenience, it also encompasses viral infection. The present invention is particularly directed to a reduction in respiratory, gut or skin infection and most particularly to respiratory infection.

Another aspect of the present invention provides for the use of a product derived from treated wood as an animal bedding material, which material reduces animal odour when an animal is maintained in the presence of said material.

Animal odour contemplated by this aspect of the invention covers waste odour such as from urine of faeces and from the biodeterioration of animal bedding material. A particular animal waste odour reduced by the present invention is ammonial odour.

Yet another aspect of the present invention is directed to the use of a product derived from treated wood as an animal bedding material, which material carries fewer microorganisms per $cm^3$ compared to animal bedding material from untreated wood products.

Still a further aspect of the present invention contemplates the use of a product derived from treated wood as an animal bedding material, which material exhibits reduced biodeterioration over time compared to animal bedding material from untreated wood products.

Yet another aspect of the present invention contemplates the use of a product from treated wood as an animal bedding material, which material exhibits at least one of the following properties:

(i) reduces the incidence of microbial infection such as respiratory infection in an animal maintained in the presence of said material;

(ii) reduces animal odour such as waste odour when an animal is maintained in the presence of said material;

(iii) caries fewer microorganisms per $cm^3$ compared to animal bedding material from untreated wood products; and/or (iv) reduced biodeterioration over time compared to animal bedding material from untreated wood products.

Preferably, the animal bedding material of the present invention exhibits at least two of the above-mentioned properties, more preferably at least three of the above-mentioned properties and most preferably all four of the above-mentioned properties.

Another aspect of the present invention contemplates a method for reducing the incidence of microbial infection in a housed animal, said method comprising maintaining said housed animal in the presence of a product derived from treated wood.

A "housed" animal means a situation where an animal is held captive in an enclosure or where it voluntarily remains in an enclosure. A "housed animal" therefor includes caged animals or boxes for animal such as kennels, stables or other shelters.

A further aspect of the present invention is directed to a method for reducing the development of animal waste odour in an animal house said method comprising maintaining animals in said house in the presence of a product derived from treated wood.

Still a further aspect of the present invention relates to reducing biodeterioration of animal bedding material, said method comprising manufacturing said animal bedding material from a product of treated wood.

The term "product" in relation to treated wood is used in its broadest sense and encompasses wood shavings and sawdust. Where sawdust is used, the particle size will vary depending, for example, on the animal housed, the number of animals housed and whether nesting is to be encouraged. Where shavings are used, preferred sizes include, but are not limited to, a thickness of from about 2 mm to about 20 mm, a length of from about 2 mm to about 100 mm and a width of from about 2 mm to about 50 mm. A combination of sawdust and shavings may also be used or other material may be added to facilitate evaporative exchange with the atmosphere and/or to prevent sludge formation. Derivatives of wood shavings and sawdust are also contemplated such as sheets of compressed shavings and/or sawdust. In the latter case, the sheets are conveniently prepared by compression of wood by-products in rollers, preferably in the presence of a bonding material such as a lining or for rapid changing of animal litter in caged or housed animals. The use of sheets also results in easy storage and packaging of animal bedding material. The thickness of the sheets will vary depending on the animals housed but the thickness is generally from about 0.1 mm to 15 mm, more preferably from about 0.2 mm to about 10 mm and even more preferably from about 0.2 mm to about 2.5 mm. The wood by-products are generally compacted to a density of from about 0.3 to about 1.1 g/cm$^3$ with a moisture content varying from about 5% to about 20% by weight. Compressed sheets also encompass material such as chipboard for use, for example, in a disposable animal house (see below) or in other applications such as involving animals. The treated wood products may also be in the form of paper or cardboard which would have a variety of uses such as in animal housing or animal care.

The present invention extends to any wood capable of a penetrating preservative treatment process such as CCA treatment. Preferred types of wood include soft woods such as pine, balsam, eastern white cedar, western red cedar, eastern hemlock, Douglas-fir, black spruce, white spruce and tamarack. Preferred pines include radiata pine (*Pinus radiata*), jack pine (*Pinus banksiana*), eastern white pine (*Pinus strobus*) and loblolly pine (*Pinus taeda*). The most preferred wood is treated radiata pine. Other wood may be used provided they can be subjected to penetrating preservative treatment. The present invention extends, therefore, to some aromatic timbers, rain forrest timbers, mahogany, moranti, certain eucalupts and oregon. As stated above, the treatment process is any penetrating treatment such as CCA treatment. It does not extend to topically treated wood as this may be harmful to the animals and the treatment chemicals tend to leach out when wet. A particular advantage of the penetrating treatments contemplated by the present invention, such as CCA treatment, is that the timber is treated prior to industrial use. Consequently, the by-product of the treated wood may be used directly without any further treatment which avoids multiple handling of the product and is economically more efficient. Furthermore, as part of the treatment process, the wood is first dried. As a consequence, the timber has reduced levels of natural irritants, such as oils or sap, which may contribute to the beneficial properties of the treated timber by-products in animal bedding.

Reference herein to animal odour is particularly directed to ammonia odour from urinary wastes and/or arising from biodeterioration of the bedding material. It is a feature of the present invention that the ammonia odour in animal bedding material made from treated wood waste products is reduced relative to the odour resulting from animals housed in the presence of untreated wood shavings or sawdust. The present invention extends, however, to a reduction in other odours arising from the animals and/or the biodeterioration of the bedding material.

The animal bedding material of the present invention may include other agents such as antimicrobial compounds or compounds of medicinal value added to the treated wood products. Such agents would need to be non-toxic to the animals and are preferably in a dry powder or particulate form. Other agents contemplated by the present invention include indicator dyes or other indicator material to indicate, for example, ammonia content, water spillage, faecal contamination or microbial growth. Furthermore, specific bacteria or other microorganisms such as yeast, may be added to the bedding material to facilitate establishment of preferred local flora to skin, respiratory passages and/or the gut. Such microorganisms would need to be resistant to the treated wood products or would need to remain viable in the bedding material prior to colonising the housed animal. The seeding of the desired organisms would be most useful where recently born animals are housed. The animal bedding material may also have a colouring agent such that bedding material may be available in different colours. Such availability would greatly facilitate animal management such as in research laboratories or commercial animal houses such as kennels and chicken hatcheries. Medicated compounds include cytokines, and may be in the form of tablets, medicated granules, slowing releasing materials and vaccines.

The present invention contemplates, therefore, in a particularly preferred embodiment, the use of sawdust or shavings from CCA treated wood in the manufacture of an animal bedding material exhibiting at least one of the following properties:

(i) reduced incidence of microbial infection such as respiratory infection in an animal housed in the presence of the material;
 (ii) reduced odour such as ammonia odour when animals are maintained in the presence of said material;
 (iii) carries fewer microorganisms per cm$^3$ compared to animal bedding from untreated wood products; and/or
 (iv) reduced biodeterioration over time compared to animal bedding material from untreated wood products;
wherein said animal bedding material optionally further comprises one or more agents selected from a colouring agent, ammonia indicator agent, an anti-microbial agent, a medically useful agent, an insecticide or seeded microorganisms.

The present invention also extends to a product from treated wood packaged for sale and optionally with instructions for use. Such instructions for use would include use as animal bedding material to reduce respiratory infection in housed animals, to reduce animal odour, to reduce microbial content per cm$^3$ of bedding material and/or to reduce biodeterioration of animal bedding material.

The reduction of biodeterioration of animal bedding material is important to reduce the requirement of frequent change of animal bedding material which has economic and time benefits. It also further reduces the likelihood of microbial growth and infection resulting therefrom in the animal litter.

In yet another aspect of the present invention, there is provided a method for producing animal bedding material said method comprising:
 (i) selecting a species of treated timber;
 (ii) processing said treated timber to obtain a product therefrom;
 (iii) collecting said product and providing same as animal bedding material;
 (iv) optionally adding further agents to said animal bedding material such as antimicrobial, indicator or medicated agents;
 (v) optionally packing said animal bedding material for sale with or without instructions for use.

Instructions for use, if provided, would include use of the bedding material to reduce respiratory infection, to reduce animal waste odour (e.g. ammonia odour), to reduce growth or viability of microorganisms in the animal bedding litter and/or to reduce biodeterioration of the animal litter.

Still a further aspect of the present invention is directed to a disposable animal house constructed from disposable material, said animal house comprising an animal bedding material which is a product of treated wood.

Such a disposable animal house has advantages of being disposable and comprising an animal bedding material which exhibits at least one of the following properties:
 (i) reduced incidence of respiratory infection in an animal housed in the presence of the material;
 (ii) reduced ammonia odour when animals are maintained in the presence of said material;
 (iii) carries fewer microorganisms per $cm^3$ compared to animal bedding from untreated wood products; and/or
 (iv) reduced biodeterioration over time compared to animal bedding material from untreated wood products.

The disposable housing may itself be made out of treated wood products such as in the from of paper, cardboard, chipboard or the like.

The animal bedding material may optionally further comprise one or more agents selected from a colouring agent, ammonia indicator agent and a medically useful agent.

Animals contemplated herein are livestock animals (e.g. sheep, cows, horses, donkeys, goats, alpacas, chickens, ducks, geese and other poultry birds, emus, ostriches and deer), domestic animals (e.g. dogs and cats), laboratory test animals (e.g. mice, rats, hamsters, rabbits and guinea pigs) and captive or tamed wild animals (e.g. foxes, kangaroos and dingoes). Use of the subject animal bedding material for pigs may be contraindicated and may first require further treatment prior to use.

In a further embodiment of the present invention there is provided an animal bedding system comprising a first layer of coarse material derived from wood and a second layer of fine material derived from treated wood said first and second layers separated by a porous layer to permit movement of faeces and/or urine from said first to said second layers.

Preferably, the first layer is derived from treated wood.

Preferably, the first layer is of sufficient coarseness to facilitate nesting.

Preferably, the second layer is fine and absorbent and is optionally contained within an absorbent membrane.

Preferably, the porous layer is in the form of a grid.

The animal bedding system of this aspect of the present invention provides superior nesting properties, eliminates bedding mobility from cage corners, optimises absorbency, minimises toxicity to animals, minimises ammonia formation thereby prolonging bedding life, minimises respiratory irritation and/or optimises the anti-bacterial properties of the bedding material.

The present invention is further described by the following non-limiting Figures and/or Examples.

In the Figures:

FIG. 1 is a graphical representation showing effect of long-term exposure to CCA treated bedding material on the ability of an animal to retract a limb, step and ambulate from within a defined area. Solid: cages with treated shavings; Hatched: cages with wire floor only, without shavings.

FIG. 2 ia a graphical representation showing the effect of long term exposure of housed animals to CCA-treated bedding on the ability to ambulate during a 30 minute test. Rats housed on CCA-treated bedding (solid) for greater than 10 months were indistinguishable from those housed in cages with wire floors only, without shavings (hatched).

EXAMPLE 1

Beneficial Effects of Animal Bedding Material

Sawdust and shavings from *Pinus radiata* treated with CCA were used as an animal bedding material for rats housed in wire cages. The cages were suspended approximately 100 mm above PVC trays containing 25 mm of fine to medium shavings. The following observations were taken after several weeks:

1. An absence of wheezing and coughing which is often observed in laboratory rats maintained in the presence of untreated wood shavings or sawdust;
2. A reduction of gross signs of microbiological breakdown of the bedding material which is commonly seen when untreated *Pinus radiata* and other bedding materials are used. As is the case with most species confined to a limited living area, rats urinate and defecate in defined areas of the cage, usually in the corners. Within a couple of days after the bedding is changed, untreated bedding in soiled corners turns black as breakdown commences. However, this does not happen when CCA treated bedding material is used. These areas of bedding deterioration can encompass up to 20% of the total cage floor area after one week;
4. The bedding trays did not have to be changed as frequently and the ammonia smell was not as severe when CCA treated shavings were used, in comparison to shavings from other non-treated timber such as *Pinus radiata* or oregon. Ammonia in the laboratory reached a level or 5 ppm in three days or less when untreated shavings were being used. When treated shavings were used, this level of 5 ppm was not reached until the 6th or 7th day; and
5. The general state of the animals' health was improved when CCA treated shavings were used as bedding material. This is an important indication when animal welfare and occupational health and safety perspectives are considered.

EXAMPLE 2

Effects of CCA Treated Material On Animals

Clinical trials were conducted using CCA treated shaving as bedding for colony animals which were housed in groups of six or seven, and which came in direct contact with the CCA treated shavings or in no shavings. Observations of these animals in regard to their food intake, body weight, motor function and fertility and fecundity were made. Rats housed for over eighteen months under these conditions were indistinguishable in regard to their behaviours as those housed in the presence of non-treated shavings.

Figure 1:
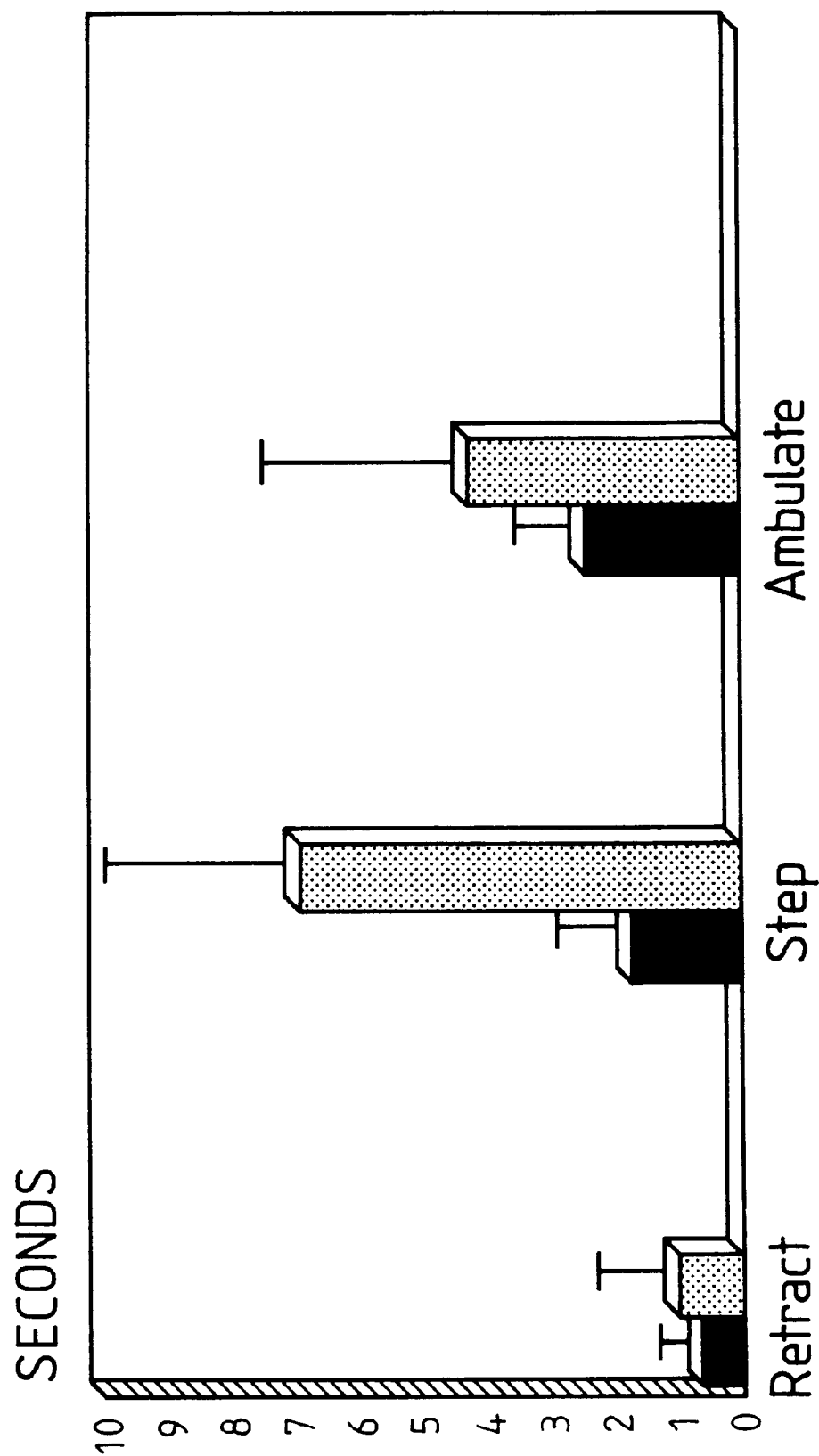
Figure 2:
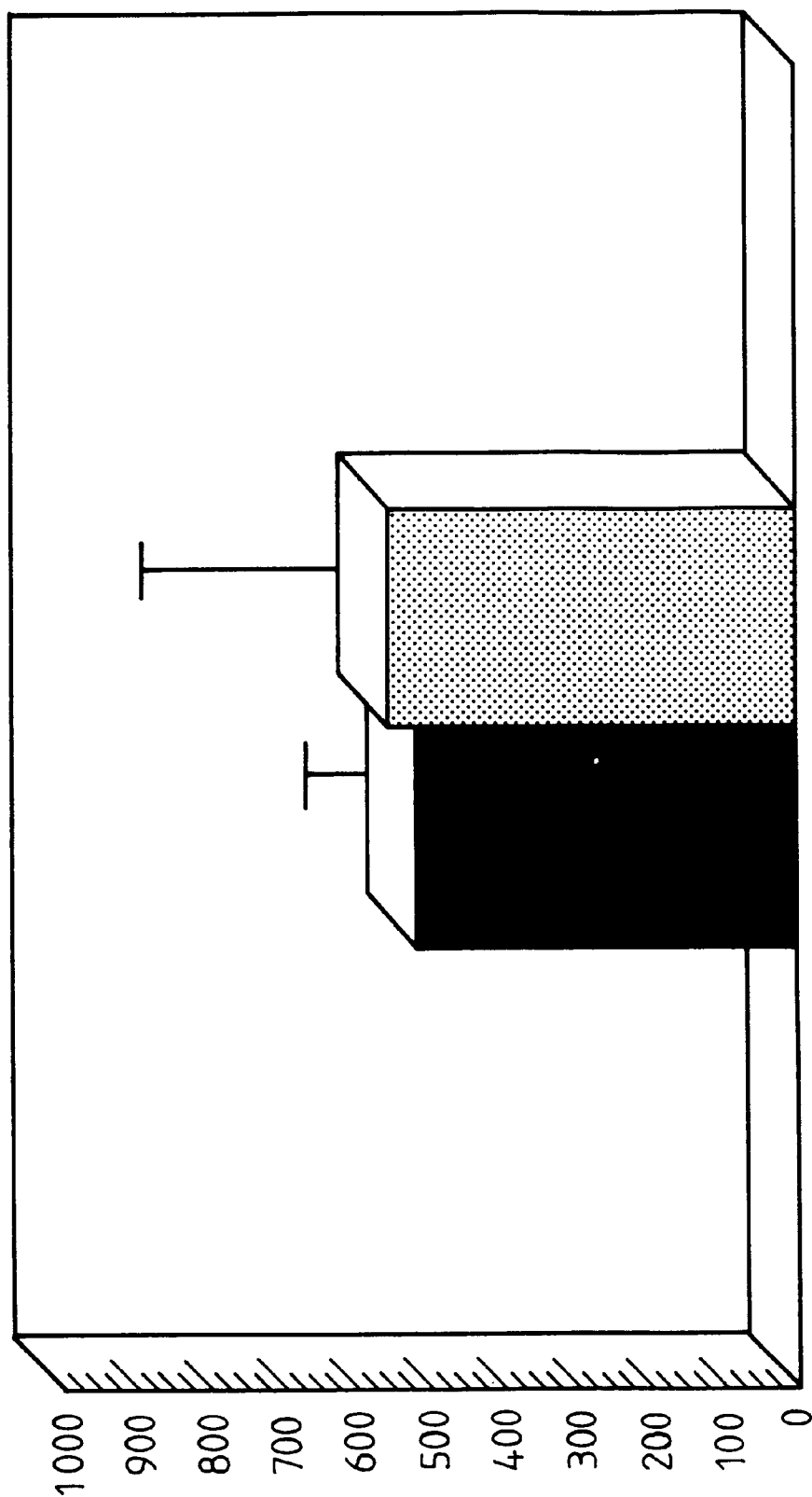

Behavioural toxicology studies were conducted to monitor changes in behaviour as indices of toxicity of various substances, these changes being far more sensitive than the measurement of tissue levels of toxic elements. As shown in FIGS. 1 and 2, the motor activity and reflex performance of animals that have been housed over an extended period of time in CCA treated dust and shavings is the same as that of animals housed in cages above the bedding material and not coming into contact with the bedding material.

FIG. 1 indicates the effect of long-term exposure to CCA treated bedding materials on the ability to retract a limb, step and ambulate from within a defined area. In regard to the time required to perform these tasks, animals bedded on the treated shavings (solid) were not significantly different from those housed in cages with wire floor (hatched). FIG. 2 is an indication of the effect of long-term exposure to CCA treated bedding material on the ability to ambulate during a thirty minute test. Rats housed on treated bedding (solid) for greater than ten months were indistinguishable from those housed in cages with wire floors without sawdust (hatched).

EXAMPLE 3

Effect of CCA Treated Bedding Material on Horses

Arsenic is one element which has been used extensively as an anthelmintic in many species including horses. It has been used to increase nutrient absorption by improving circulation and as the primary constituent of a toxic used for improving the general health of animals. Horses bedded in stalls of CCA treated shavings for prolonged periods remained very healthy and in fact exhibited an increased appetite. There was also no indication that they regularly ingested the treated shavings. Furthermore, as has been observed in the laboratory, when CCA treated shavings were used as bedding material, the stables did not have to be changed with the same frequency as when non-treated materials were used. This is due to the anti-microbiological action of the treated shaving.

EXAMPLE 4

Commercial Potential of CCA Treated Animal Bedding

It has been common practice in saw mills to first dry the timbers, then treat it with CCA and finally to dress the timber for the subsequent product. This creates a relatively large volume of CCA treated shavings and dust. In addition, large volumes of CCA treated off-cuts are generated every year. The present invention now provides a secondary industry for CCA treated timber shavings, off cuts and sawdust. The inter alia creates a significant improvement in the environment in that other rate or native timbers will not have to be employed for this use. Furthermore, commercial environments for animals and the health of the animals will be improved.

EXAMPLE 5

Effects of CCA Treated Bedding on Biodeterioration

Figure 3:
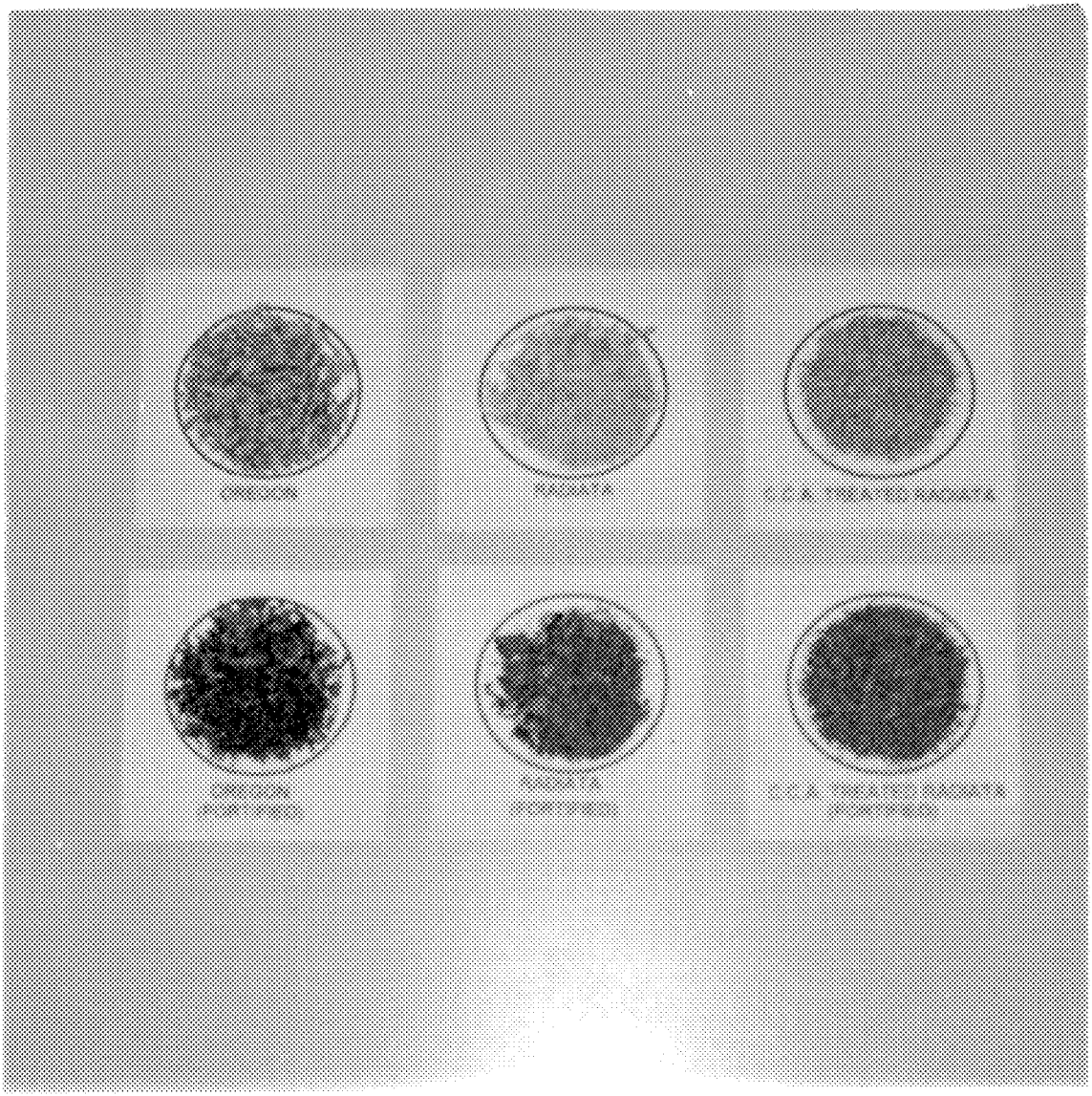
FIG. 3 is a photographic representation showing reduced biodeterioration of CCA treated radiata shavings relative to untreated wood.. "Fortified" means used bedding material.

FIG. 3 is a photographic representation showing reduced biodeterioration of CCA-treated bedding compared to untreated bedding. "Fortified" means used bedding material. The biodeterioration is indicated by a reduction in colour change and reduced change in consistency of treated bedding relative to untreated bedding.

EXAMPLE 6

Three-part Animal Bedding System

Figure 4:
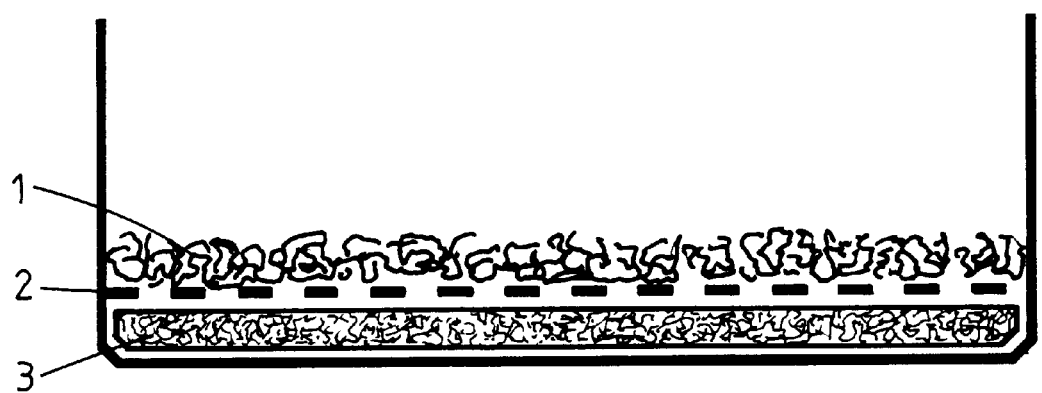
FIG. 4 is a diagrammatic representation of a 3-part animal bedding system.

FIG. 4 is a diagrammatic representation of a 3-part animal bedding system.

The first layer is of course, low toxicity material suitable for nesting; the second layer is a grid structure to permit permeation of faeces and urine; the third layer is of fine, absorbent, deodorised material contained within an absorbent membrane. The 3-part bedding system provides:

(i) a superior nesting material;
(ii) an elimination of bedding mobility from cage corners;
(iii) optimal absorbency;
(iv) minimal toxicity to animals;
(v) minimal ammonia formation thereby prolonging bedding life;
(vi) minimal respiratory irritation; and
(vii) optimal anti-bacterial properties of the bedding material.

Those skilled in the art will appreciate that the invention described herein is susceptible to variations and modifications other than those specifically described. It is to be understood that the invention includes all such variations and modifications. The invention also includes all of the steps, features, compositions and compounds referred to or indicated in this specification, individually or collectively, and any and all combinations of any two or more of said steps or features.

I claim:

1. A method for reducing the incidence of microbial infection in a housed animal, said method comprising maintaining said housed animal in the presence of a product derived from wood treated by chromated copper arsenate.

2. A method according to claim 1 wherein the wood is a soft wood.

3. A method according to claim 2 wherein the wood is a pine, balsam, eastern white cedar, western red cedar, eastern hemlock, Douglas-fir, black spruce, white spruce or tamarack.

4. A method according to claim 3 wherein the pine is *Pinus radiata, Pinus banksiana, Pinus strobus* or *Pinus taeda*.

5. A method according to claim 4 wherein the pine is *Pinus radiata*.

6. A method according to claim 1 wherein the microbial infection is a respiratory infection.

7. A method according to claim 1 wherein said method reduces animal waste odour of a housed animal.

8. A method according to claim 7 wherein the animal waster odour is an ammonia odour.

9. A method according to claim 1 wherein the product is shavings or sawdust.

10. An animal bedding system comprising a first layer of coarse material derived from wood and a second layer of fine material derived from wood treated by chromated copper arsenate second layers separated by a porous layer to permit movement of faeces and/or urine from said first to said second layers.

11. An animal bedding system according to claim 10 wherein the first layer is dervived from wood treated by chromated copper arsenate.

12. An animal bedding system according to claim 10 or 11 wherein the wood is pine.

13. An animal bedding system according to claim 12 wherein the wood is *Pinus radiata*.

\* \* \* \* \*

UNITED STATES PATENT AND TRADEMARK OFFICE
CERTIFICATE OF CORRECTION

PATENT NO. : 5,964,187

DATED : October 12, 1999

INVENTOR(S) : Gregory Lynn Willis

It is certified that error appears in the above-identified patent and that said Letters Patent is hereby corrected as shown below:

Title Page, Item [56] References Cited, FOREIGN PATENT DOCUMENTS: "1864092 3/1993 Australia" should read -- 1834092 3/1993 Australia --;

Column 1, line 23: "subside" should read -- subsidize --

Column 1, line 31: "industries" should read -- industries. Within the --

Column 1, line 59: "created approximately" should read -- created an approximately --

Column 2, line 28: "ammonial" should read -- ammonia --

Column 5, line 42: "from" should read -- form --

Column 6, line 41: "2. A reduction of" should read -- 2. A reduction in wheezing and coughing in rats afflicted with this complaint and exposed for the first time to the treated bedding material. ¶3. An absence of --;

Column 7, line 28: "floor" should read -- floors --;

Column 7, line 42: "toxic" should read -- tonic --;

UNITED STATES PATENT AND TRADEMARK OFFICE
CERTIFICATE OF CORRECTION

PATENT NO. : 5,964,187

DATED : October 12, 1999

INVENTOR(S) : Gregory Lynn Willis

It is certified that error appears in the above-identified patent and that said Letters Patent is hereby corrected as shown below:

Column 7, line 53: "shaving" should read -- shavings --;

Column 7, line 61: "timbers," should read -- timber, --;

Column 7, line 66: "The inter" should read -- This *inter* --;

Column 7, line 67: "alia" should read -- *alia* --;

Column 8, line 1: "rate" should read -- rare --;

Column 9, line 7: "arsenate second" should read -- arsenate, said first and second --.

Signed and Sealed this

Seventeenth Day of April, 2001

*Attest:*

NICHOLAS P. GODICI

*Attesting Officer*      *Acting Director of the United States Patent and Trademark Office*